United States Patent [19]

Ishimaru et al.

[11] 4,186,864
[45] Feb. 5, 1980

[54] METHOD FOR PRODUCING A WELDED JOINT

[75] Inventors: Yasuo Ishimaru; Hiroshi Kobayashi; Junji Tamura, all of Kudamatsu, Japan

[73] Assignee: Hitachi, Ltd., Japan

[21] Appl. No.: 842,358

[22] Filed: Oct. 14, 1977

[30] Foreign Application Priority Data

Oct. 29, 1976 [JP] Japan .................. 51-129517
Jul. 29, 1977 [JP] Japan .................. 52-90352

[51] Int. Cl.² ........................................... B23K 33/00
[52] U.S. Cl. .................. 228/226; 219/137 R; 228/256
[58] Field of Search .......... 228/27, 225, 226, 256; 219/137 R, 125.12, 76.12, 76.14

[56] References Cited

U.S. PATENT DOCUMENTS

| | | |
|---|---|---|
| 2,288,433 | 6/1942 | Boetcher et al. .............. 219/137 R |
| 3,306,116 | 2/1967 | Ross et al. .................. 228/27 X |
| 3,571,557 | 3/1971 | Valentine .................... 228/27 X |
| 3,610,876 | 10/1971 | Bhat ........................ 219/137 R |
| 3,925,634 | 12/1975 | Mulder ...................... 219/76.12 |

FOREIGN PATENT DOCUMENTS 913083 10/1946 France ...................... 228/225

Primary Examiner—Francis S. Husar
Assistant Examiner—K. J. Ramsey
Attorney, Agent, or Firm—Craig and Antonelli

[57] ABSTRACT

When a welded joint is produced for joining metal components by applying a plurality of layers of deposited metal, the plurality of layers of deposited metal are provided in a groove of a weld preparation formed between the metal components to be joined in such a manner that each layer of deposited metal has a small thickness and a large width crosswise of the groove and the layers are arranged to be superposed one over another. During this process, a coarse metal structure formed when each underlying layer of deposited metal is provided is completely tempered and transformed into a fine metal structure by the heat generated when each overlying layer of deposited metal is provided. Thus the welded joint produced by this method shows an excellent performance in service.

4 Claims, 11 Drawing Figures ized as follows. A layer

METHOD FOR PRODUCING A WELDED JOINT

LIST OF PRIOR ART REFERENCES

The following references are cited to show the state of the art:

Preprints of the National Meeting of J.W.S. No. 19 (Autumn 1976) and;

Preprints of the National Meeting of J.W.S. No. 15 (Autumn 1974).

BACKGROUND OF THE INVENTION

This invention relates to a method for producing a welded joint.

A welded joint produced by a method of the prior art is shown schematically in cross section in FIG. 1. The process for producing the welded joint of the structure shown in FIG. 1 can be explained by referring to FIG. 2 in which a deposited metal 1 provided by the preceding welding operation and a deposited metal 2 provided by the next following welding operation are positioned at the right and left sides in lapping relation.

By vertically applying layers of the deposited metal which are first arranged at the right and left sides in lapping relation, a groove of a V-shape of a weld preparation formed between components 3 and 4 to be welded is deposited with a filler metal.

A welded joint produced by the process described above includes layers of deposited metal which each have a large thickness in the vertical direction. Because of the great thickness, it is impossible to temper an underlying layer of deposited metal in its entirety by the heat generated when a layer of deposited metal located immediately over the underlying layer of deposited metal is formed. Therefore, it is impossible to cause transformation of a coarse metal structure, such as a columnar metal structure, which is formed when the underlying layer of deposited metal is provided, into a fine metal structure in its entirety.

More specifically, in welded joints of the prior art, it is only those parts of the layers of deposited metal which overlap one another that are tempered and transformed into a fine metal structure. Moreover, inasmuch as the layers of deposited metal each have a large thickness, gases existing in the molten metal are unable to escape by diffusion to outside at the time the deposited metal is still in molten state, resulting in entrapment of these gases in the deposited metal.

Such being the case, conventional welded joints have a metal structure such that it has holes therein and includes a coarse metal structure which causes a reduction in the toughness of the welded joints at low temperatures. Thus welded joints of the prior art have had the disadvantages of being unsatisfactory in performance.

SUMMARY OF THE INVENTION

This invention has as its object the provision of a method for producing a welded joint which shows an excellent performance, wherein a coarse metal structure produced when the receding layer of deposited metal is provided can be transformed in its entirety into a fine metal structure by the heat generated when the next following layer of deposited metal is provided.

The aforementioned object of the invention can be accomplished by providing a method wherein a quantity of molten metal is produced in a groove formed between metal components to be joined and spread thinly and widely crosswise of the groove so that an underlying layer of deposited metal of a small thickness and a large width can be provided, another quantity of molten metal having a sufficiently large amount of heat to transform a coarse metal structure formed when the underlying layer of deposited metal is provided into a fine metal structure is produced on said underlying layer of deposited metal and spread thinly and widely crosswise of the groove to provide an underlying layer of deposited metal of a small thickness and a large width, and the aforesaid method steps are repeated.

DESCRIPTION OF THE PREFERRED EMBODIMENT

The method for producing a welded joint according to the present invention is essentially as follows. A layer of deposited metal of small thickness and a large width provided by the preceding welding operation is formed on its entire upper surface with a layer of molten metal of a small thickness and a large width provided by the next following welding operation in such a manner that the overlying layer wholly covers the underlying layer. This process is repeated. Thus the layer of deposited metal provided by the preceding welding operation is reheated in its entirety by the heat generated when the layer of molten metal overlying it is provided by the next following welding operation. The reheated layer of deposited metal provided by the preceding welding operation is reconditioned such that its metal structure is transformed into a fine metal structure.

Owing to the fact that each layer of molten metal is small in thickness and large in width, gases in the molten metal can readily escape by diffusion from the molten metal to outside. Because of this, the weld metal constituting the welded joint has a very fine metal structure and is free from gas, with the result that the welded joint produced by the method according to the invention shows an excellent performance.

Figure 1:
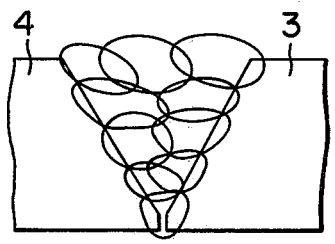
FIG. 1 schematically shows in cross section a welded joint produced by a welding method of the prior art.
Figure 2:
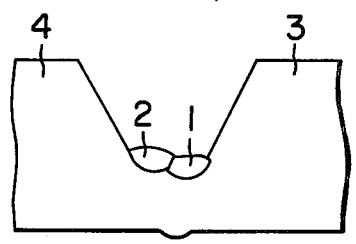
FIG. 2 schematically shows in cross section the process for producing the welded joint of FIG. 1 according to a prior art method.
Figure 3:
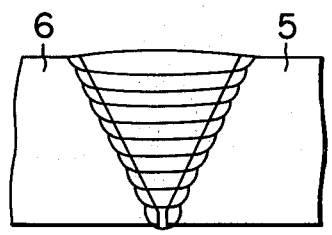
FIG. 3 schematically shows in cross section a welded joint produced by the method according to the present invention.
Figure 5:
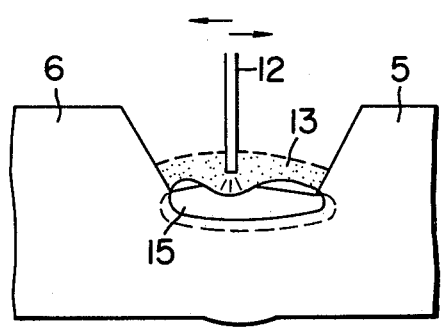
FIG. 5 shows the movement of a filler wire for welding adopted in the method of production according to the invention.

The method for producing a welded joint according to the invention will now be described in detail. As shown in FIG. 5, a groove of the V-shape is formed between components 5 and 6 of a parent metal to be welded, and a filler wire 12 for welding is oscillated crosswise of the groove in the directions of arrows shown in FIG. 5. By oscillating the filler wire 12 in this way, a molten metal 15 of a small thickness and a large width can be provided along the entire width of the groove in a manner to be disposed beneath a flux 13. Layers of deposited metal provided by this process are superposed one over another in vertically arranged relation. If the groove of a weld preparation is deposited with a weld metal for fabrication of a welded joint, then the welded joint consists of a plurality of layers of deposited metal each having a small thickness and a large width as shown in cross section in FIG. 3.

Particularly when the groove of a weld preparation has a large width, a two-pass welding process may be adopted for each layer of deposited metal. In this case too, it is necessary to oscillate the filler wire 12 in such a manner that a layer of molten metal can provide in the groove a layer of deposited metal which is small in thickness and large in width.

Figure 4:
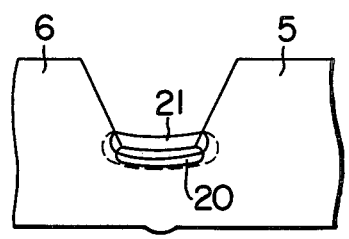
FIG. 4 schematically shows in cross section a welded joint which is in the course of production and not completed yet by the method according to the invention.

By using this method, it is possible to cover a solidified underlying deposited metal layer 20 in the entire range of its width with an overlying molten metal layer 21 as shown in FIG. 4. Moreover, the overlying molten metal layer 21 can be spread widthwise of the groove of the weld preparation to make the layer small in thickness and large in width by oscillating the filler wire 12. This provides a molten metal pool having a large gas diffusing outlet which is convenient in letting residual gases in the molten metal layer 21 escape quickly by diffusion to outside from the molten metal layer 21. Inasmuch as the underlying deposited metal layer 20 has a small thickness, the heat generated when the overlying molten metal layer 21 is provided can readily envelop the underlying deposited metal layer 20 in its entirety as indicated by a broken line in FIG. 4. The result of this is that a coarse metal structure produced when the underlying deposited metal 20 is provided is entirely reheated and transformed into a fine metal structure. Thus the welded joint produced by this method shows an excellent performance.

Figure 9:
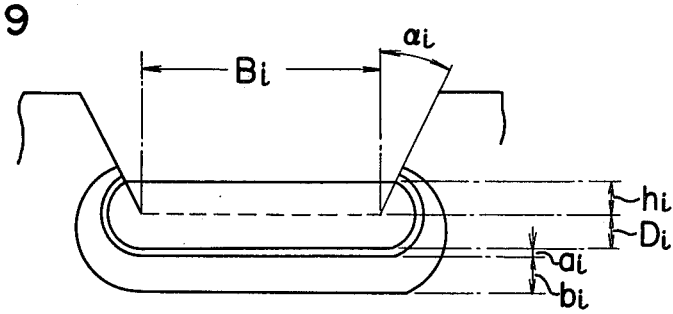
FIG. 9 schematically shows the shape of a deposited metal provided by the method according to the invention and the range of values influenced by the heat generated when the deposited metal is provided.

The conditions for producing a deposited metal of the shape most suitable for producing this transformation phenomenon will be described by referring to FIG. 9. When a No. i deposited metal layer is reheated by the heat generated when an overlying No. i+1 deposited metal layer is provided, one has only to form deposited metal layers which satisfy the following formula:

$$h_i < (D_{i+1} - D_i) + (a_{i+1} - a_i) + b_{i+1}$$

where $h_i$ is the height of the padding of No. i welded metal; $D_i$ is the depth of penetration of No. i deposited metal; $D_{i+1}$ is the depth of penetration of No. i+1 deposited metal; $a_i$ is the thickness of the metal coarsened by the influence of heat of No. i deposited metal; $a_{i+1}$ is the thickness of the metal coarsened by the influence of heat of No. i+1 deposited metal; and $b_{i+1}$ is the thickness of the metal which has become finer in grain size due to the influence of heat of No. i+1 deposited metal.

The aforementioned formula can be obtained as a function of the angle $2\alpha$ of the groove, the welding current I, the welding voltage, the welding speed V, the range of the oscillating movement $\theta c$ and the preheating temperature T.

Figure 10:
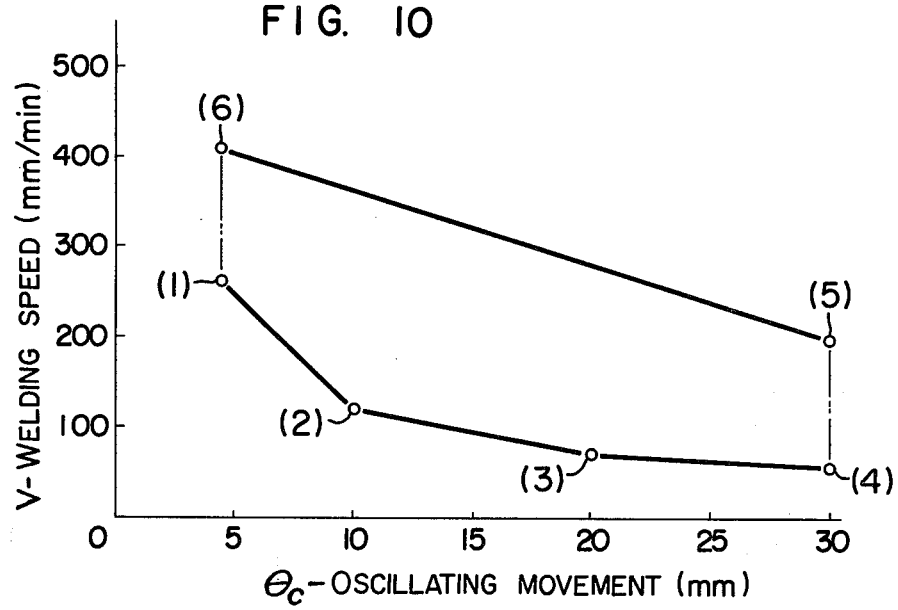
FIG. 10 is a graph showing the limits of conditions for performing welding commercially by the method according to the invention.

FIG. 10 shows in a graph the relation between the welding speed V and the range of the oscillating movement $\theta c$ obtained from both the results of calculation performed by using the formula referred to above and the results of experiments conducted. In the graph shown in FIG. 10, the conditions for the welding operation include the following: the angle of the groove $2\alpha_i$, less than 90 degrees; the preheating temperature T, less than 250° C.; the welding current I, 200–600 A; and the diameter of the filler wire, 2.4–4.8 mm. If the range of the oscillating movement $\theta c$ and the welding speed V optimal for the production method in accordance with the present invention under the aforementioned conditions are obtained, the results can be shown for each welding current I as follows (the values in the bracket refer to the range of the oscillating movement $\theta c$ and the welding speed V):

When I is 200 A:
  (1) (4 mm and 260 mm/min)
  (2) (10 mm and 120 mm/min)
  (3) (20 mm and 70 mm/min)
  (4) (30 mm and 60 mm/min)

When I is 600 A:
  (5) (30 mm and 200 mm/min)
  (6) (4 mm and 410 mm/min)

The lines connecting the points (1), (2), (3) and (4) together in the graph of FIG. 10 indicate a minimum welding speed which is essential to performing a welding operation when the welding current I is 200 A. By performing welding at a speed V higher than this minimum speed, it is possible to provide layers of deposited metal of a small thickness which can accomplish the objects of the present invention. In the event the welding current I becomes greater in value towards 600 A, layers of deposited metal of a small thickness which can accomplish the objects of the present invention can be obtained even if the welding speed V is increased as the welding current becomes higher in value. However, it has been found that, for all practical purposes, the range of values surrounded by the lines connecting the points (1), (2), (3), (4), (5) and (6) in FIG. 10 is the practical range of conditions for producing layers of deposited metal most suitable for accomplishing the objects of the invention, when filler wires that can be put to practical use, the welding current and the appearance of the weld bead are taken into consideration.

In FIG. 10, particularly if welding is performed under conditions of a range of values lower than the aforementioned practical range of values, the height $h_i$ of the padding of the deposited metal becomes too great, with the result that it is impossible to envelop, by the heat generated when an overlying layer of deposited metal is provided, the entire coarse metal structure of an underlying layer of deposited metal which has become too thick because of too much padding. Thus, it is impossible to provide layers of deposited metal which can accomplish the objects of the invention. It has been found that, if welding is performed under conditions of a range of values higher than the aforementioned practical range of values, the layers of deposited metal contain many remaining portions in which coarse structure is not refined, so that the deposited metal is not suitable for improving the performance of the welded joint.

Figure 11:
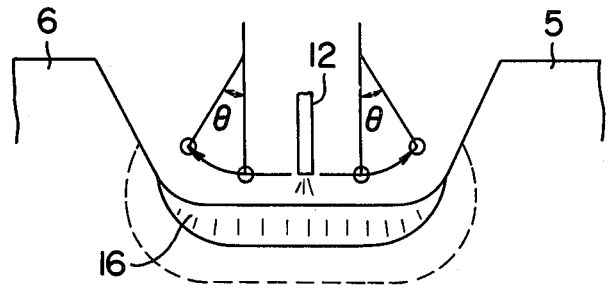
FIG. 11 shows the movement of a filler wire for welding which is more preferable, the shape of a deposited metal, and the range of values influenced by the heat generated when the deposited metal is provided.

As an alternative process for producing layers of deposited metal of a small thickness and a large width, the filler wire 12 may be oscillated as follows. That is, the filler wire 12 which has moved horizontally in the central portion of the groove of a weld preparation is rotated upwardly through an angle $\theta$ at each end of the groove in the direction of width thereof as shown in FIG. 11. This angular rotation of the filler wire 12 causes the lower end portion of the wire 12 to swing upwardly. This movement of the filler wire 12 enables a deposited metal 16 to have a smaller thickness at both ends thereof than at its central portion as shown in FIG. 11. Owing to this shape of the deposited metal, the heat generated when the next following layer of deposited metal is provided is effective to temper both the underlying layer of deposited metal and the components of the parent metal to be joined by welding which are in contact with the deposited metal at both crosswise end portions thereof. Thus the metal structure of the parent metal to be welded which has become coarse due to exposure to a heat of a temperature near its melting point temperature can be transformed into a fine metal structure. This phenomenon occurs when a deposited metal of a shape shown in FIG. 5 is provided. However, it is to be noted that this phenomenon can be induced to occur more readily when a deposited metal of a shape shown in FIG. 11 is provided.

Figure 6:
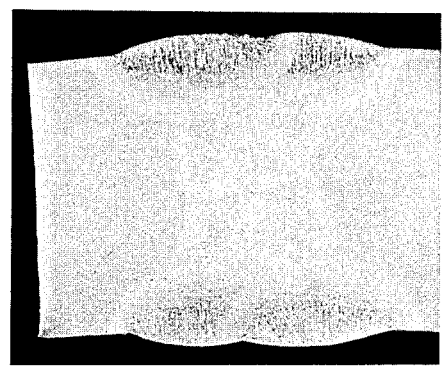
FIG. 6 is a photograph showing the macroscopic structure of a welded joint produced by the method according to the invention.
Figure 7:
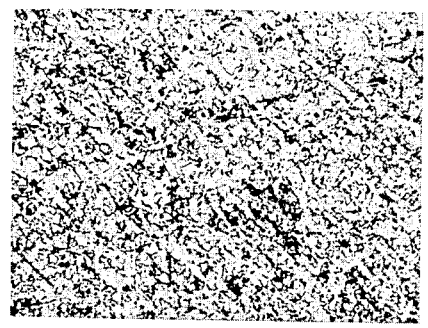
FIG. 7 is a photograph showing the microstructure of a welded joint produced by the method according to the invention.

The results obtained by carrying into practice the method according to the present invention for producing a welded joint will be described. FIG. 6 is a photograph showing the macroscopic structure of the layers of deposited metal of a welded joint, in which underlying layers of deposited metal are shown as being covered entirely by overlying layers of deposited metal. FIG. 7 is a photograph showing the microstructure of the layers of deposited metal shown in FIG. 6. In FIG. 7, it will be seen that the deposited metal has a fine metal structure. The metal structure shown in these pictures has been produced under the following welding conditions.

Figure 8:
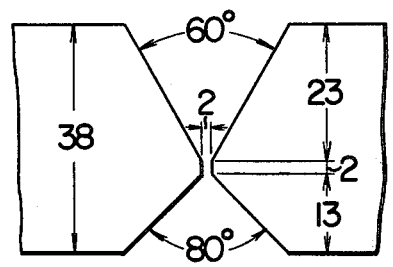
FIG. 8 shows the dimensions of the groove of the welded joint shown in the photograph of FIG. 6.

The parent metal used was of SA203 grade E according to the ASME standards and had a thickness of 38 mm. The workpieces made of this parent metal were arranged in a manner to form therebetween a groove of a weld preparation having dimensions shown in FIG. 8 (shown in mm).

The photograph shown in FIG. 6 has a magnification ×1, while the photograph shown in FIG. 7 has a magnification ×112.

The welding conditions were as follows:
Current AC: 320 to 360 A (350 A on an average).
Voltage: 32 to 36 V (35 V on an average).
Welding Speed: 200 to 280 mm/min.
Oscillation Speed: 30 oscillations per minute.
Width of Each Oscillation: 4 to 30 mm (varying depending on the width of the groove).
Wire: A compound wire of a diameter of 3.2 mm.
Flux: A bond flux.

From the foregoing description, it will be appreciated that according to the method provided by the invention, a weld bead which is flat and shallow but is sufficiently large in width to exert a thermal influence is provided in a groove of a weld preparation in a manner to have a width which extends along the entire width of the groove at the height of each layer of deposited metal to be provided, so that the weld bead will cover an underlying layer of deposited metal and heat the same sufficiently to transform the metal structure thereof into a fine metal structure. At the same time, gases can escape by diffusion with a greater freedom than hitherto from the molten metal of a small thickness and a large width, with the result that entrapment of gas in the layers of deposited metal can be minimized. Thus gas-free welded joints can be automatically produced when welding is carried out.

We claim:

1. A method for producing a welded joint in a groove between metal components forming a weld preparation by multiple superimposed layers of deposited metal comprising the steps of:
   (a) providing a base layer of deposited metal of a small thickness and a large width by producing a quantity of molten metal in said groove of the weld preparation in such a manner that that the molten metal spreads thinly and widely crosswise of the groove;
   (b) providing an underlying layer of deposited metal of a small thickness and a large width by producing a quantity of molten metal in the groove of the weld preparation in such a manner that the molten metal spreads thinly and widely crosswise of the groove upon the layer therebeneath;
   (c) providing an overlying layer of deposited metal of a small thickness and a large width by producing another quantity of molten metal on the surface of said underlying layer of deposited metal in such a manner that the molten metal spreads thinly and widely crosswise of the groove, said another quantity of molten metal having heat of an amount sufficiently large to transform, by the heat transmitted from said overlying layer, both the coarse structure of said underlying layer into a fine metal structure as well as increase the fineness of the metal structure of the layer beneath said underlying layer;
   (d) repeating the steps of (b) and (c); and
   wherein the layers of deposited metal are produced with a shape such that the layers have a smaller thickness at end portions thereof adjacent the metal components as viewed widthwise of the groove of the weld preparation than at their central portion.

2. A method as set forth in claim 1, further comprising the step of (e) moving a welding wire in oscillating motion for producing said molten metal thinly and widely.

3. Method according to claim 1, wherein each layer of metal deposited in steps (b) and (c) is formed according to the following $$h_i < (D_{i+1} - D_i) + (a_{i+1} - a_i) + b_{i+1}$$

wherein $h_i$ is the height of the padding of No. i welded metal; $D_i$ is the depth of the penetration of No. i deposited metal; $D_{i+1}$ is the depth of penetration of No. i+1 deposited metal; $a_i$ is the thickness of the metal coarsened by the influence of heat of No. i deposited metal; $a_{i+1}$ is the thickness of the metal coarsened by the influence of heat of No. i+1 deposited metal; and $b_{i+1}$ is the thickness of the metal which has become finer in grain size due to the influence of heat of No. i+1 deposited metal.

4. A method for producing a welded joint in a groove between metal components forming a weld preparation by multiple superimposed layers of deposited metal comprising the steps of:

(a) providing a base layer of deposited metal of a small thickness and a large width by producing a quantity of molten metal in said groove of the weld preparation in such a manner that the molten metal spreads thinly and widely crosswise of the groove;
(b) providing an underlying layer of deposited metal of a small thickness and a large width by producing a quantity of molten metal in the groove of the weld preparation in such a manner that the molten metal spreads thinly and widely crosswise of the groove upon the layer therebeneath;
(c) providing an overlying layer of deposited metal of a small thickness and a large width by producing another quantity of molten metal on the surface of said underlying layer of deposited metal in such a manner that the molten metal spreads thinly and widely crosswise of the groove, said another quantity of molten metal having heat of an amount sufficiently large to transform, by the heat transmitted from said overlying layer, both the coarse structure of said underlying layer into a fine metal structure as well as increase the fineness of the metal structure of the layer beneath said underlying layer;
(d) repeating the steps of (b) and (c); and
wherein each layer of metal deposited in steps (b) and (c) is made to have a shape such that the layer has a smaller thickness at end portions thereof as viewed widthwise of the groove of the weld preparation than at its central portion by directing a welding arc upwardly only at the end portions of the groove of the weld preparation as viewed widthwise thereof, the welding arc being moved horizontally in the central portion.

* * * * *